May 30, 1950 J. HUGHES 2,509,823
MEANS FOR OPENING BALES OF FIBERS
Filed July 10, 1947 2 Sheets-Sheet 2

Inventor,
John Hughes
per Ferdinand Broster Bosshardt
Attorney.

UNITED STATES PATENT OFFICE 2,509,823

MEANS FOR OPENING BALES OF FIBERS

John Hughes, Rochdale, England

Application July 10, 1947, Serial No. 760,033
In Great Britain April 4, 1946

Section 1, Public Law 690, August 8, 1946
Patent expires April 4, 1966

6 Claims. (Cl. 19—65)

This invention relates to that kind of means for opening bales of fibres wherein the bales are fed upwards to teeth which comb or flake fibres from the top of the bales.

The object of my invention is to provide a novel construction which enables bales composed of any kind of staple fibres to be opened at a relatively quick speed and the fibres to be delivered in an open condition, without danger of clogging of the teeth and consequent ineffectiveness thereof.

Means of the hereinbefore specified kind for opening bales of fibres in accordance with my invention comprises a horizontal row of toothed or spiked rollers adapted to rotate at a relatively slow speed in combination with a horizontal row of toothed or spiked rollers each of which is superposed vertically above one of the rollers of the lower row and is adapted to rotate at a relatively high speed, some of the rollers of the lower row being adapted to rotate in reverse direction to the remaining rollers of the lower row, whereby the lower row of rollers comb or flake fibres from the top of the bale or bales and convey the detached fibres upwards between some of them to within reach of the upper row of rollers and the upper rollers throw the detached fibres into an enclosed space above them, break up any lumps of fibres and prevent clogging of the lower row of rollers.

An outlet is provided from the enclosed space and opens directly into a casing containing a rotary condensing cage the interior of which is connected to air exhausting means, whereby the opened fibres are drawn from the enclosed chamber on to the condenser drum.

The rows of rollers and the outlet may be so situated that the fibres flung into the chamber are drawn directly into the orifice.

Alternatively a baffle may be provided in the enclosed space and the rows of rollers and outlet be so arranged relative to the baffle that the fibres are thrown by the upper row of rollers to that end of the enclosed space which is remote from the outlet before they are drawn through the outlet, whereby any lumps of fibres flung off the rollers may fall again under the opening action of the rollers.

One or more guide surfaces may be provided in the enclosed space to guide the lumps back to the rollers.

One or more adjustable trap members may be provided to prevent loose fibres from falling down one or more sides of the bales.

Trucks may be provided to rest on the bale elevating means and carry the bale or bales to be opened, whereby introduction of a bale or bales into the bale opening is facilitated.

I attain the hereinbefore stated object by the means illustrated in the accompanying drawings, wherein—

Figure 1:
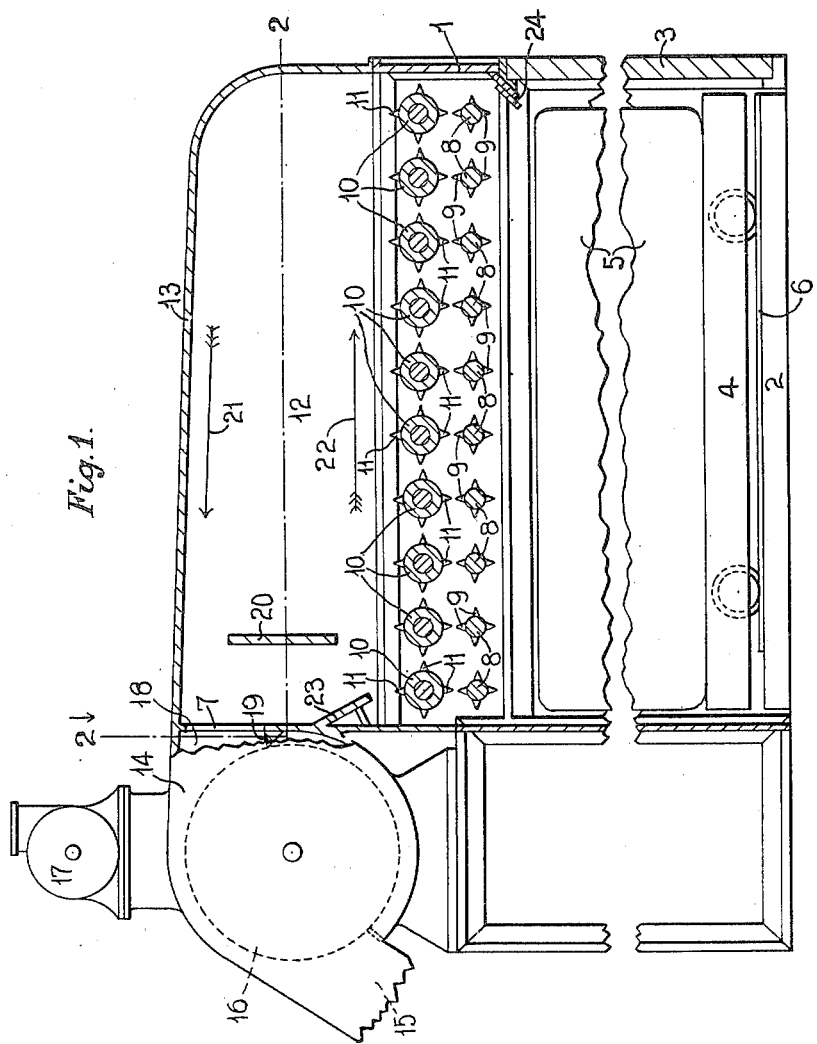
Figure 1 is a fragmentary side view, partly in section, of means for opening bales of fibres.
Figure 2:
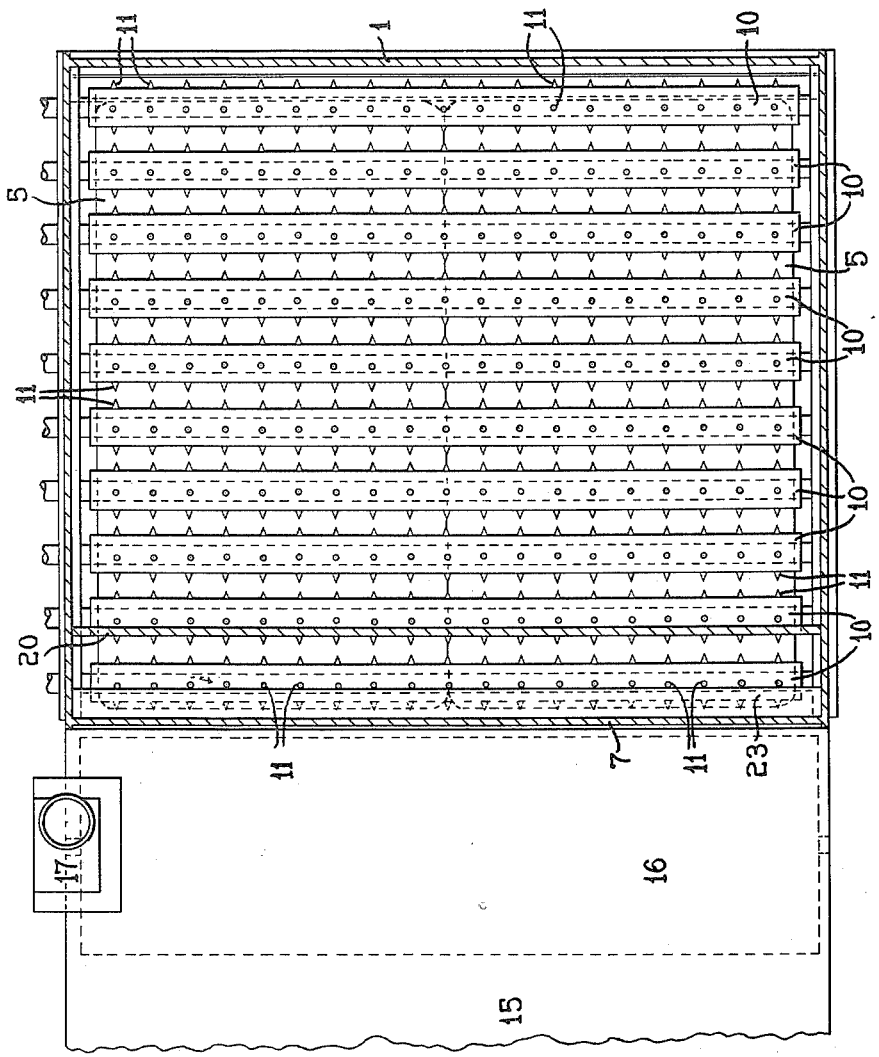
Figure 2 is a fragmentary plan view in section taken on a line corresponding with line 2—2 of Figure 1.

Referring to the drawings, in the construction shown therein I provide a casing 1 containing an elevatable platform 2 and having a door 3 through which a truck 4 carrying bales 5 can be pushed on to rails 6 provided on the platform 2. When the door 3 is shut the casing is completely closed except for an outlet 7 extending from the closed top of the casing 1 a suitable distance down one side thereof.

A horizontal row of rollers 8, for example ten, are provided in the casing 1 parallel with the said side and have straight spikes or teeth 9. The rollers 8 are adapted to be driven slowly, for example at about 3 to 12 revolutions per minute, from outside the casing by any suitable driving means (not shown), so that the first, third, fifth, seventh and ninth rollers 8 rotate in one direction, whilst the second, fourth, sixth, eighth and tenth rollers 8 rotate in the reverse direction.

A horizontal row of rollers 10 of larger diameter and having straight spikes or teeth 11 are provided closely above the row of rollers 8 with their axes vertically above and parallel with the axes of the rollers 8, there being one roller 10 above each roller 8. The rollers 10 are adapted to be driven quickly, for example at about 1000 revolutions per minute, from outside the casing 1 by any suitable driving means (not shown) so that all the rollers 10 rotate in the same direction and the teeth 11 at the top travel towards that side of the casing which is opposite to the side provided with the outlet 7.

The teeth or spikes 9 and 11 are radial and spaced circumferentially wide apart to avoid clogging.

The rollers 8 and 10 are at a considerably lower elevation than the bottom of the outlet 7 and a considerable distance from the closed top 13 of the casing 1, so that a space 12 of a considerable height exists between the rollers 10 and the top 13.

The outlet 7 is directly connected to the intake 18 of the casing 16 of a rotary condensing cage which has a delivery trunk 15 and contains a slowly rotatable condensing drum 16 having a perforate periphery and adapted to have air drawn from its interior through the casing by a fan or blower 17 so that air is drawn in a stream from the casing 1 through the outlet 7 and the intake 18 and through the periphery of the drum 16, means being provided for automatically stripping or releasing fibres from the said periphery as the drum 16 rotates, so that they can fall through the delivery trunk 15. An adjustable baffle plate 19 in the casing 14 determines the area of the periphery of the drum 16 presented to the air stream.

In operation, as the bales 5 are fed upwards, the rollers 8 comb or flake masses of fibres off their upper surfaces until the whole of each bale has been broken up. The combings or flakings are forced upwards by the cooperative action of some of the rollers 8 with others thereof, so that masses of the combings or flakings are driven upwards between the rollers 10 of the second row and are vigorously atacked by them in a manner which opens the fibres of the masses and flings the opened and therefore easily filoatable fibres into the space 12. These floatable fibres float along with the air stream created in the space by the suction of fan or blower 17 and are collected by the perforated periphery of the drum 16, released and delivered through the delivery trunk 15. The fibres which are thrown up by the rollers 10 whilst still in a matted mass of insufficient lightness to float with the air stream fall back to the rollers until the mass has been reduced to a sufficiently open state to enable the fibres which constituted the matted mass to float with the air stream. The air currents set up by the fast rotating rollers 10 blow off any excess of fibres on the rollers 8 and automaticaly prevent the spikes or teeth 9 thereof from becoming clogged and so failing to comb or flake fibres from the bales.

To intensify the selective action of the air stream, a baffle plate 20 may be provided in the space 12 to lengthen the course which the air stream takes on its way to the outlet 7 and as far as possible cause it to flow along the underside of the closed top 13 of the casing 1 from that side which is opposed to the side provided with the outlet 7, namely in the direction of the arrow 21. The spikes or teeth 11 of the rollers 10 and the air current created thereby immediately above the rollers 10 drive the fibres towards the said opposed side of the casing 1, namely in the direction of the arrow 22, and those fibres which are in a sufficiently open state arrive in the air current which is immediately beneath the top 13 and which carries them in the reverse direction to the outlet 7. Any fibres which are not in a sufficiently fleecy state, are given an opportunity before they can be carried by the air stream to the outlet 7 of falling down again to the rollers 10 for further opening treatment.

A guide plate 23 may be provided in the casing 1 beneath the outlet 7 to guide any insufficiently opened fibres which fall close to the outlet 7 back to where they will again come under the action of the rollers 10.

A trap plate 24 adapted to project from one or more sides of the casing 1 may be provided therein to prevent fibres from falling down one side or sides of the bales 5 to below the upper surface thereof and therefore remaining in the casing. As bales vary in size, the plate 24 is preferably adjustable so that the extent of its projection can be varied to suit the different sizes of bales.

I claim:

1. Means of the specified kind for opening bales of fibres, comprising in combination, a casing, an elevatable platform therein, trucks provided on the platform for carrying bales, two horizontal rows of rollers provided in the casing above the trucks, one row being disposed above the other row, for removing fibres from the bales and throwing them into the uppermost part of the casing, and an outlet provided in the casing for extraction of removed fibres from the uppermost part of the casing.

2. Means of the specified kind for opening bales of fibres, comprising in combination, an elevatable platform for elevating bales of fibres, a horizontal row of spiked rollers above the platform and rotatable at a low speed for combing fibres from the upper ends of the bales presented to them, a horizontal row of spiked rollers each of which is superposed vertically and immediately above one of the rollers of the lower row, and an enclosed space above the superposed rollers, alternate rollers of the lower row being rotated in reverse direction to the remaining rollers of the lower row for causing the separated fibres to be fed by the row of lower rollers directly upwards to the superposed rollers and the superposed rollers being rotatable at high speed for throwing the fed fibres into the said enclosed space above them, breaking up any lumps of fibres and preventing clogging of the lower row of rollers.

3. Means of the specified kind for opening bales of fibres, comprising in combination a casing, an elevatable platform in the casing for feeding bales of fibres upwards, a horizontal row of spiked rollers rotatable at a low speed and situated in the casing above the platform for dragging fibres from the fed bales, alternate rollers being rotatable in reverse direction to the remaining rollers for feeding the dragged fibres upwards, a horizontal row of rollers each disposed in the casing vertically above a roller of the first named row and rotatable at a high speed for throwing the upwardly fed fibres above them, breaking up lumps of upwardly fed fibres and preventing clogging of the lower rollers, an outlet provided in the casing at a higher elevation than the rollers, a casing into which the said outlet opens directly, a rotary condensing cage in the second named casing and air exhausting means connected to the condensing cage.

4. Means of the specified kind for opening bales of fibres, comprising in combination, a casing, two horizontal rows of horizontal spiked rollers therein, one row of which is below the other the lower row being for removing fibres from a bale fed upwards to it and conveying the removed fibres upwards and the upper row being for throwing the conveyed fibres into the upper part of the casing towards one side thereof, an outlet provided in the opposite side of the casing above the level of the higher row of rollers, air exhausting means for drawing air out of the casing through the said outlet, a baffle in the casing in advance of the outlet for preventing fibres from passing from the roller through the outlet by the shortest path, and an elevatable platform in the casing for feeding the bale upwards to the lower row of rollers.

5. Means of the specified kind for opening bales of fibres, comprising in combination, two horizontal rows of horizontal rotatable spiked rollers, one row being arranged above the other and the rollers of the upper row being rotated at a higher speed than the rollers of the lower row, an elevatable platform beneath the rollers for feeding bales of fibres upwards to the lower row of spiked rollers and thereby causing fibres to be removed by the lower row of spiked rollers from the bales, a casing containing the rollers, for receiving in its upper part fibres removed from the bales and elevated by the lower row of spiked rollers and thrown upwards by the upper row of spiked rollers, an outlet in the casing at a higher level than the rollers, an air exhausting means for drawing air and fibres floating therein from the casing through the outlet and a guide surface for returning to the rollers lumps of fibres flung thereby into the upper part of the casing.

6. Means of the specified kind for opening bales of fibres, comprising in combination, two horizontal rows of rotatable spiked rollers arranged one above another and rotated at different speeds, an elevatable platform beneath the said spiked rollers for feeding bales of fibres up to the lower row of spiked rollers and thereby enabling them to remove fibres from the bales, a casing containing the said rollers for receiving fibres removed from the bales beneath the rollers and elevated by the lower rollers and thrown upwards by the upper rollers, an outlet in the casing at a higher level than the rollers, an air exhausting device for drawing air from the casing through the outlet, and trap means provided in the casing for preventing fibres from falling outside the limits of the top of the bale.

JOHN HUGHES.

REFERENCES CITED

The following references are of record in the file of this patent:

UNITED STATES PATENTS

| Number | Name | Date |
| --- | --- | --- |
| 1,375,985 | Vardell | Apr. 26, 1921 |
| 1,545,367 | Tice | July 7, 1925 |
| 2,192,823 | Aycock | Mar. 5, 1940 |
| 2,221,262 | Nims et al. | Nov. 12, 1940 |